United States Patent
Matsuda et al.

[11] Patent Number: 6,091,680
[45] Date of Patent: Jul. 18, 2000

[54] FOCUS CONTROL APPARATUS

[75] Inventors: Norio Matsuda; Takashi Suzuki; Kazushige Kawana; Hitoshi Yamazaki; Yuichi Kimikawa; Masakazu Takahashi; Kenichi Takahashi, all of Kawagoe, Japan

[73] Assignee: Pioneer Electronic Corporation, Tokyo, Japan

[21] Appl. No.: 09/102,250

[22] Filed: Jun. 22, 1998

[30] Foreign Application Priority Data

Jun. 27, 1997 [JP] Japan .................................. 9-172656

[51] Int. Cl.<sup>7</sup> ..................................................... G11B 7/00
[52] U.S. Cl. .................................. 369/44.29; 369/44.27; 369/94
[58] Field of Search ........................... 369/43, 44.11, 369/44.25, 44.26, 44.27, 44.28, 44.29, 44.35, 47, 54, 58, 94

[56] References Cited

U.S. PATENT DOCUMENTS

5,263,011  11/1993  Maeda et al. .......................... 369/94 X
5,740,136   4/1998  Tsutsui et al. ......................... 369/94 X
5,781,516   7/1998  Yamada ................................. 369/94 X
5,999,503  12/1999  Tateishi et al. ....................... 369/94 X Primary Examiner—Paul W. Huber
Attorney, Agent, or Firm—Perman & Green, LLP

[57] ABSTRACT

Disclosed is a focus control apparatus of the present invention capable of successfully performing an accurate focus jump operation without an erroneous operation of a focus actuator. The apparatus irradiates a light beam onto a recording medium, and generates a focus actuator drive signal for moving an optimized light convergence point of the light beam from one recording surface to the other, based on a focus error signal generated based on a returned light from the recording medium. The focus control apparatus comprises a detector for detecting that the focus error signal crosses a predetermined level as a specified level crossing; instruction means for generating a focus jump instruction; a drive signal generating means for generating the drive signal in response to the focus jump instruction and receiving a detection output from the detection circuit to recognize a timing of a specified level crossing of the focus error signal upon receipt of the detection output, thereby extinguishing the drive signal at the timing of the specified level crossing detection timing; and inhibiting means for inhibiting the recognition of the specified level crossing by the drive signal generating section for a predetermined period in response to the focus jump instruction.

7 Claims, 6 Drawing Sheets

FOCUS CONTROL APPARATUS

BACKGROUND OF THE INVENTION

1. Field of the Invention

This invention relates to a focus control apparatus, more particularly to a focus control apparatus for controlling an optimized light convergence point of light beam relative to a specified recording surface of a recording medium, which is irradiated onto the recording surface of the recording medium.

2. Description of the Related Art

Nowadays, information recording mediums of capable of recording a large quantity of information with a high density called a digital video disk or a digital versatile disk (designated as DVD hereinafter) and systems using the information recording mediums are about to be widely used. For example, there is one type of disk comprising two information recording surfaces formed in two layers, respectively, which interpose an interposing layer (a spacer or a space region) between them. In order to read out information from one surface of such a type of disk with an optical pickup, a light beam must be converged on a desired information recording surface in one of the layers.

A focus jump operation for moving a focus of the light beam is performed from one information recording surface in one layer to the other information recording surface in the other layer on the basis of the detection of a zero crossing point in a focus error signal which is generated based on an output of the pickup.

More specifically, the pickup has a focus actuator. The focus actuator drives an objective lens having a predetermined focus of an optical system in an optical axis direction, which produces a light emission as the light beam, to move the focus of the light beam in a direction perpendicular to the disk surface. At an initial stage of the focus jump operation, an acceleration signal is supplied to the focus actuator as a focus jump starting signal for moving the focal point of the light beam to a target recording surface. Then, a series of the following operations are conducted in accordance with zero crossing points sequentially detected from the focus error signal acquired during the movement of the focus actuator in response to the acceleration signal; termination of the supply of the acceleration signal, supply of a deceleration signal to the focus actuator for stopping the movement of the focus actuator in response to the acceleration signal, and restart of a focus servo for the target recording surface by the completion of the supply of the deceleration signal.

Figure 1:
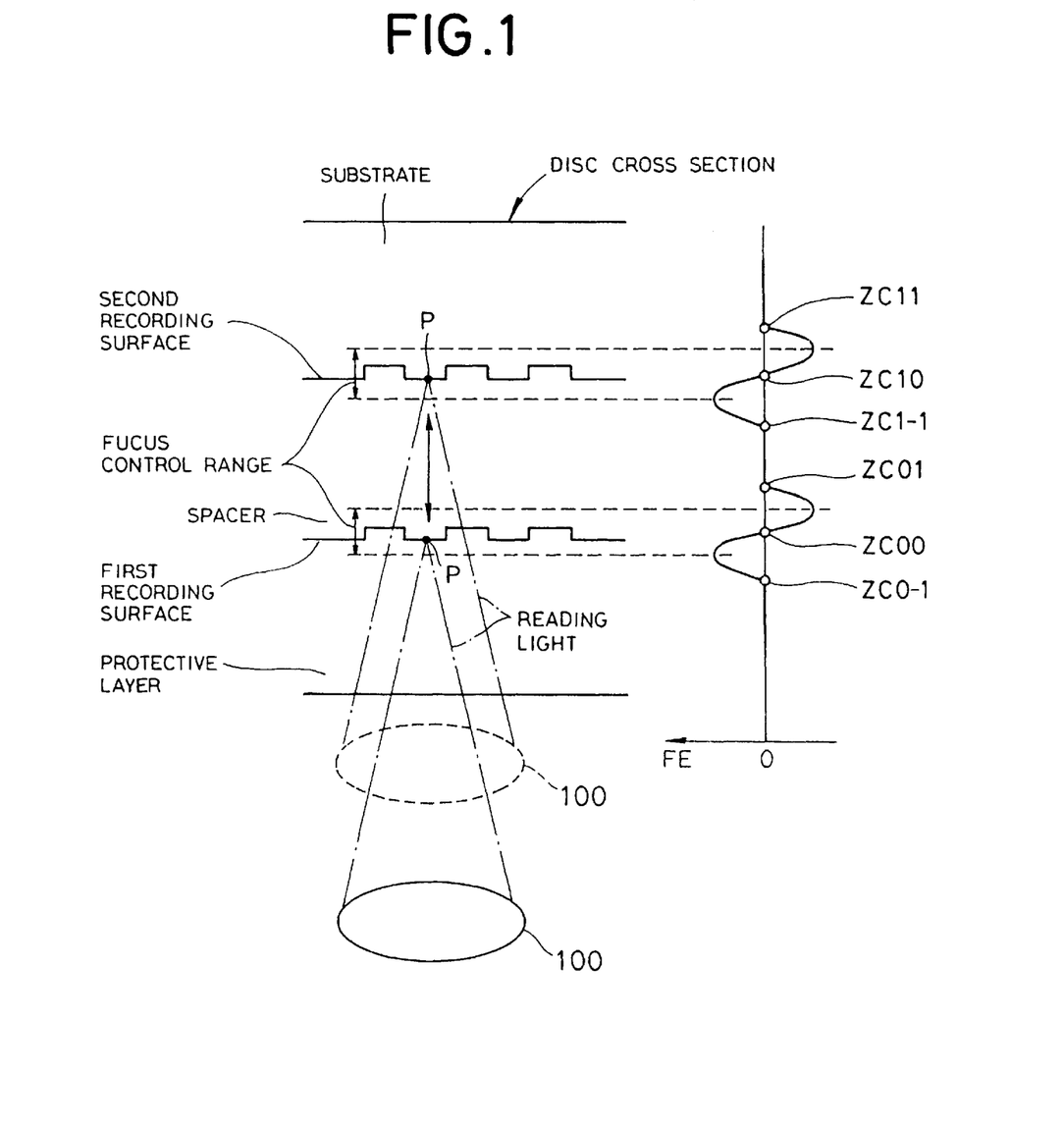
FIG. 1 shows a relation between a focal point of a light beam in an internal layer of a disk and a level of a focus error signal generated on the basis of the focal point moving in an optical axis direction in a normal focus jump operation.

FIG. 1 shows a position of the focal point P of the light beam in the internal layer of the disk which is determined by the objective lens 100, a focus error signal acquired when the focal point P moves in the optical axis direction, and a relationship therebetween. In FIG. 1, it is found that the focus error signal fundamentally draws an S-shaped profile symmetrical with a zero level point (zero crossing points ZC00 and ZC10). It is noted that the zero level point indicates that the focal point P exists on the recording surface. A range between minimum and maximum values of one S-shaped profile generally corresponds to a controllable range of a focus servo loop. The controls for the supplies of the above acceleration and deceleration signals are performed on a way of the movement of the focal point from one recording surface to the other recording surface, so that they are performed based at a timing on which one of the zero crossing points ZC00, ZC01, ZC1-1 and ZC10 is detected.

However, the focus error signal acquired during the movement of the focal point between these recording surfaces is influenced by defects of the surface of the disk, the recording surface thereof or defects of the surfaces of other internal layers. The focus error signal is also influenced by incorrectly formed marks equivalent to the above defects (designated as defects hereinafter) or a crosstalk. More specifically, if the light beam scans the defects or the crosstalk occurs, the level of the focus error signal significantly drops or rises abruptly. The focus error signal may show a false zero crossing point different from a desired zero crossing point produced by the S-shaped profile as shown in FIG. 1. In this case, it is impossible to implement the correct supply of the foregoing acceleration and deceleration signals. Therefore, the focus actuator operates erroneously, leading to a failure in the focus jump operation.

Taking the foregoing problems in consideration, an object of the present invention is to provide a focus control apparatus which is capable of successfully performing a proper focus jump operation without an erroneous operation of a focus actuator.

SUMMARY OF THE INVENTION

A focus control apparatus of the present invention which irradiates a light beam onto a recording medium having an information recording surface formed in each of at least two layers, and generates a drive signal of a focus actuator for moving an optimized light convergence point of the light beam from one portion to another portion of the recording surface based on a focus error signal, the focus error signal being generated depending on a returned light from the recording medium by the light beam. The focus control apparatus comprises detection means for detecting as a specified level crossing that the focus error signal passes through a predetermined level; instruction means for generating a focus jump instruction; drive signal generating means for generating the drive signal in response to the focus jump instruction and receiving the detection output from the detection means to recognize a timing of a specified level crossing of the focus error signal upon receipt of the detection output, thereby extinguishing the drive signal at the timing of the specified level crossing; and inhibiting means for inhibiting recognition of the timing of the specified level crossing by the drive signal generating means for a predetermined period, in response to the focus jump instruction.

The predetermined period can be set to a period until a predetermined time passes after the generation of the focus jump instruction. This predetermined time is set to be longer, in a normal operation, than that from the generation of the focus jump instruction to a point of time when the focus error signal first shows the specified level crossing. The drive signal generating means can be provided such that it supplies as the drive signal an acceleration signal having a level for accelerating and moving the focus actuator toward the optimized light convergence point of the light beam. The drive signal generating means can also be constituted such that at the timing of the specified level crossing, it generates a deceleration signal having a level for decelerating the focus actuator in order to stop the movement of the optimized light convergence point of the light beam subsequent to the generation of the acceleration signal.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Detailed description of preferred embodiment according to the present invention will be described with reference to the accompanying drawings below.

Figure 2:
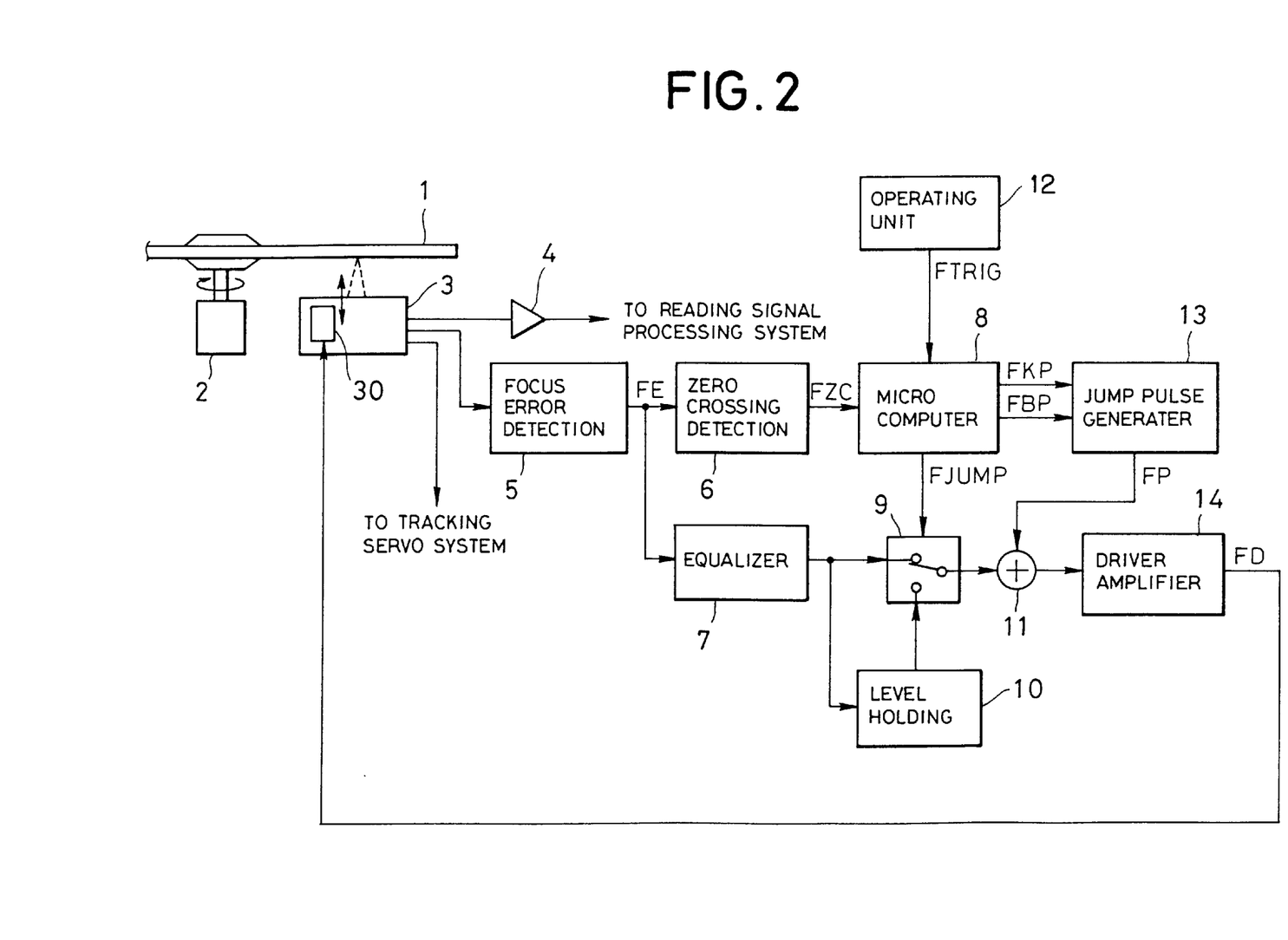
FIG. 2 is a block diagram showing a focus control apparatus of an embodiment according to the present invention, the focus control apparatus being provided in an optical disk player.

FIG. 2 shows a block diagram of an optical disk player including a focus control apparatus of an embodiment according to the present invention.

Referring to FIG. 2, a disk 1 loaded to a player is rotated by a spindle motor 2 and irradiated by a light beam emitted from a pickup 3. This light beam impinges on a recording surface through a protection layer of the disk 1, and is then modulated by means of a so-called recording mark which has recording information such as a pit formed on the recording surface. The modulated light beam returns to the pickup 3 as a reflected light from the recording surface.

The pickup 3 generates the light beam, receives the reflected light beam from the disk 1 to photoelectrically convert the received light beam to a corresponding one type of electric signals in accordance with a quantity and a condition of the received light beam. The electric signals generated by the pickup 3 includes a reading signal which has a component corresponding to recording information of the disk 1, which is called as Radio Frequency (RF) signal. A RF amplifier 4 amplifies the RF signal, which is transmitted to a signal processing system (not shown). The signal processing system reproduces an original voice/video signal or a computer data signal from the RF signal, and conveys the reproduced signal to the outside of the player.

The focus error generating circuit 5 generates a focus error signal FE with respect to the recording surface on which the light beam impinges, depending on another electrical signal supplied from the pickup 3. A third electric signal issued by the pickup 3 is supplied to a tracking servo system (not shown). The tracking servo system generates a tracking error signal, depending on the received electrical signal. The tracking servo system then controls the light beam to locate its beam spot on a center of a recording track in response to the tracking error signal.

For an example of a method for generating a focus error signal in a receiving system of the pickup 3, there is a method comprising the steps of passing the reflected light beam from the disk through a cylindrical lens to give the light beam astigmatism, and receiving the anastigmatic light with a quadrant photodetector. The quadrant photodetector has four light receiving sections which are divided by two straight lines perpendicularly intersecting at a center of a light receiving surface. The quadrant photodetector receives the light beam which has a shape and light intensity changing as function of a converging state of the light beam relative to the recording surface of the disk. The photodetector then adds photoelectric converted signals supplied from the light receiving sections symmetrical with respect to the center of the photodetector to produce two adding signals. The photodetector then calculates a difference between two addition signals to produces the resultant signal as a focus error signal.

The above method for generating the reading signal uses the quadrant photodetector to acquire the sums of the photoelectric conversion signals from all light receiving sections. However, it should be understood that other type of photodetector may be provided for acquiring the reading signal.

One method for detecting a tracking error signal employs three light beams. In addition, a method for generating a tracking error signal includes a phase difference method and a push-pull method.

The pickup 3 includes an objective lens for converging a light beam emitted from a light source onto the disk 1, and a focus actuator 30 for moving the objective lens in a direction of its optical axis. The focus actuator 30 serves to change the position of the objective lens in a direction perpendicular to the surface of the disk 1, depending on a level and a polarity of a driving signal therefor described after.

A zero crossing detector 6 and an equalizer 7 receives the focus error signal FE. The zero crossing detector 6 detects that a level of the focus error signal FE exceeds a predetermined level, generates a zero crossing detection signal FZC dependently on the detecting result to supply the zero crossing detection signal to the microcomputer 8. In this embodiment, the predetermined level corresponds to a zero level. Detailed descriptions for the detecting principle of the zero crossing detector 6 and the zero crossing detection signal FZC will be made later.

The equalizer 7 performs a waveform equalization for the focus error signal FE supplied thereto, and supplies the equalized focus error signal to a selector 9 and a level holding circuit 10. The equalizer 7 has an equalization characteristic variable by an instruction from the microcomputer 8. The selector 9 selects and supplies either one of the focus error signal from the equalizer 7 and an output signal from the level holding circuit 10 to a following adder 11 in response to a jump status signal FJUMP from the microcomputer 8. More specifically, only when the jump status signal FJUMP offers a jump operation state, the selector 9 supplies the output signal from the level holding circuit 10 to the adder 11. Otherwise, the selector 9 normally supplies the focus error signal from the equalizer 7 to the adder 11.

When the light beam is converged on the recording surface, the level holding circuit 10 holds the level of the focus error signal from the equalizer 7 immediately before the light beam jumps. The level holding circuit 10 then supplies to the selector 9 a signal for generating an initial level of the focus actuator driving signal FD during the jump operation (when a focus servo loop is released). The level holding circuit 10 will be later described in detail.

The microcomputer 8 performs various kinds of controls and processes in the player. With respect to an operation in which the focal point of the light beam jumps from one recording surface to another recording surface (referred to as a jump operation hereinafter), the microcomputer 8 executes a process corresponding to a jump operation in response to a jump instruction from an operating section 12. The operating section 12 serves as instruction means. During the jump operation, the focus actuator 30 generates a kick pulse FKP for accelerating the focus actuator 30 to move it in a predetermined direction, a brake pulse FBP for decelerating the focus actuator 30 moved by the kick pulse FKP to stop the movement along the predetermined direction, and the jump status signal FJUMP described above. A jump pulse generation circuit 13 receives both of the pulses FKP and FBR The selector 9 receives the status signal FJUMP at its input terminal.

The jump pulse generating circuit 13 assigns the corresponding polarities to the kick and brake pulses FKP and FBP to combine them for generating a jump pulse FP. The jump pulse generating circuit 13 then supplies the jump pulse FP to the adder 11.

The adder 11 adds the signal from the selector 9 and the jump pulse FP, and supplies the sum to a driver amplifier 14. The driver amplifier 14 generates a drive signal based of an output of the adder 11, and supplies the drive signal to the focus actuator 30. Thus, when a focus servo loop is closed so that the selector 9 can relay the output signal from the equalizer 7, the focus actuator 30 is driven so that the focus error signal FE has a zero level, that is, so that the focal point of the light beam is maintained on the recording surface. On the other hand, when the focus servo is opened so that the selector can relay an output from the level holding circuit 10, the focus actuator 30 is driven so that the focal point of the light beam is forcibly moved toward the target recording surface in response to the jump pulse FR Next, the focus jump operation by the microcomputer 8 as well as the operation of each element will be described.

Figure 3:
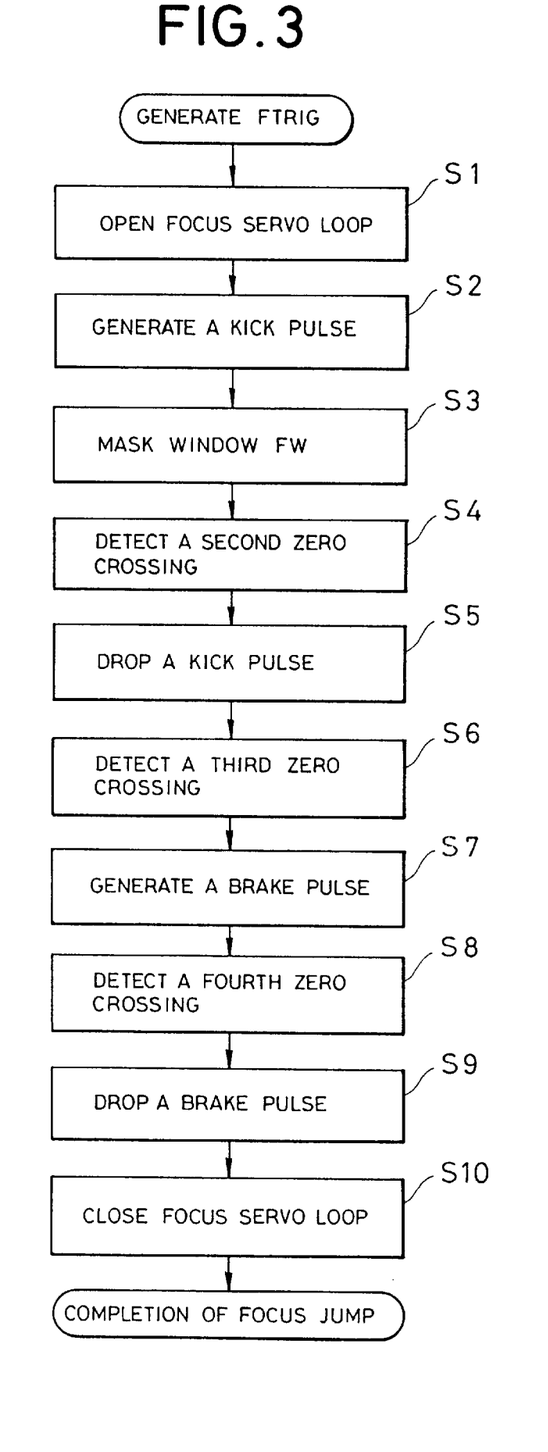
FIG. 3 is a flow chart showing procedures a focus jump operation executed by a microcomputer in the optical disk player of FIG. 2.
Figure 4:
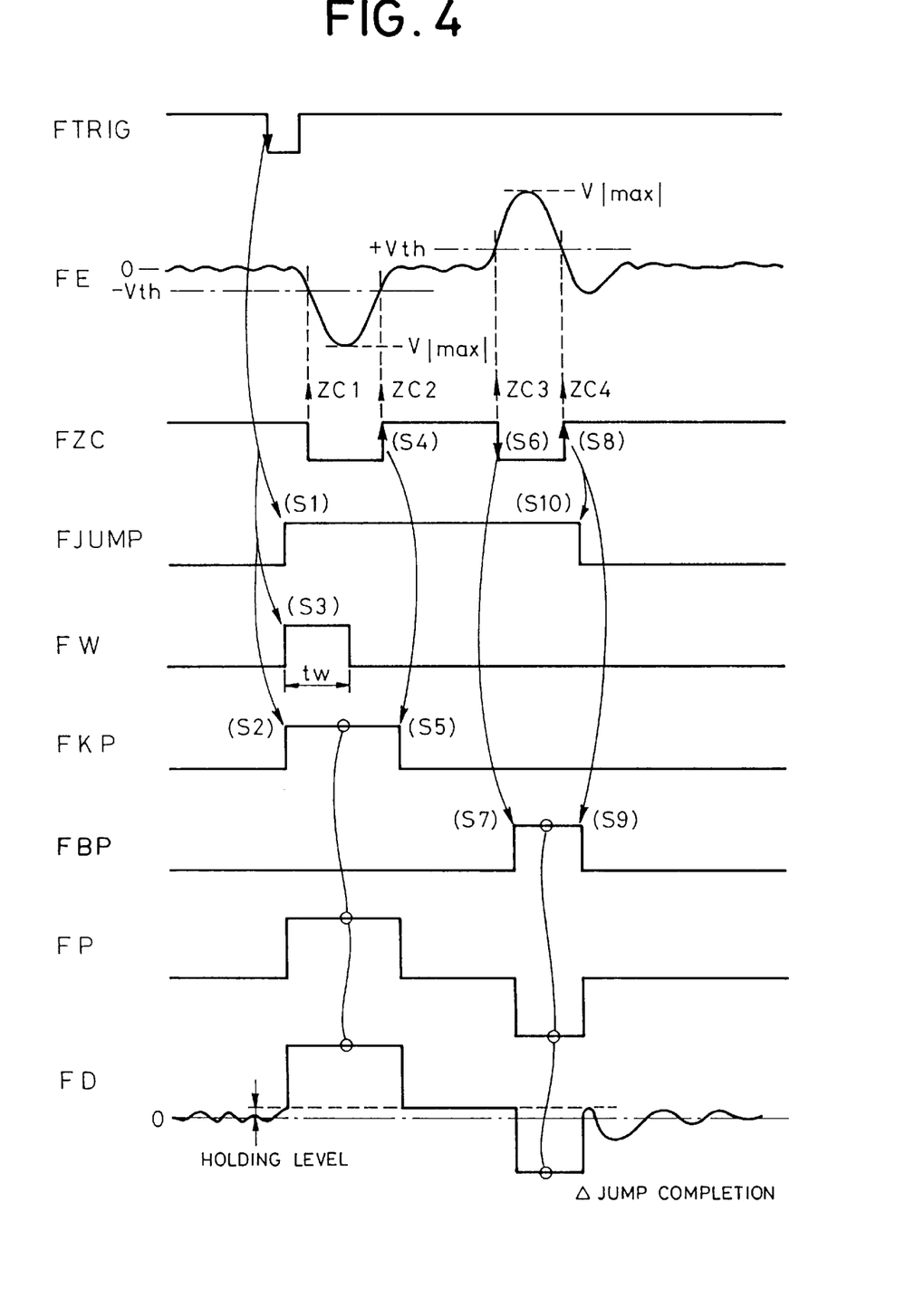
FIG. 4 shows waveforms of outputs appearing on various points of the focus control apparatus in the focus jump operation of FIG. 3.

FIG. 3 illustrates a procedure of such focus jump operation. FIG. 4 illustrates waveforms of signals described in conjunction with FIG. 2.

When the microcomputer 8 receives from the operating section 12 a focus jump instruction signal FTRIG for moving the focal point of the light beam from one recording surface to another recording surface, the microcomputer 8 interrupts a process being executed, and opens the focus servo loop (step S1). Actually, because the computer 8 supplies the jump status signal FJUMP, the selector 9 relays the output signal from the level holding circuit 10 to the adder 11, instead of the focus error signal from the equalizer 7. The microcomputer 8 then produces a kick pulse FKP (step S2).

The jump pulse generating circuit 13 then generates a jump pulse FP having a high level and a positive polarity corresponding to the kick pulse FKP. Therefore, the adder 11 adds a higher positive level of the jump pulse FP ands a holding level transmitted from the level holding circuit 10 through the selector 9 to supply a driving signal FD having a level based on a level of the sum from the driver amplifier 14 to the focus actuator 30. Consequently, during a period in which the kick pulse FKP is generated, the actuator 30 is forced to be accelerated toward another target recording surface on which the focal point of the light beam will be placed. Thus, as the focal point of the light beam is moved away from the recording surface which it tracks, the absolute level of the focus error single FE increases gradually, and then decreases to a zero level after it reaches an absolute maximum value (see FIG. 4). Thus, the focus error signal has a concave profile.

Upon raising of the kick pulse FKP, the microcomputer 8 activates a window timer provided in an internal circuit or by a program. The microcomputer 8 then starts to determine a time from the leading edge of the kick pulse FKP or the status signal FJUMP for a predetermined time period $t_w$ (step S3). FIG. 4 shows the pulse FW having a higher level for the predetermined time period $t_w$.

During the predetermined time period $t_w$, even though the microcomputer 8 receives the zero crossing detection signal FZC from the zero crossing detection circuit 6, the microcomputer 8 dose not respond. More specifically, although the microcomputer 8 recognizes the trailing edge of the zero crossing detection signal FZC as well as the leading edge thereof, the microcomputer 8 do not count the zero crossing detection signal. Accordingly, during the predetermined time period $t_w$, the trailing and leading edges of the zero crossing detection signal FZC are masked. This results in that a zero crossing point ZC1 of the focus error signal FE of FIG. 4 is ignored over the period $t_w$.

When the window timer completes the counting for a predetermined time period $t_w$, the microcomputer 8 releases the masking operation and monitors the zero crossing detection signal FZC to detect a leading edge of the zero crossing detection signal FZC (step S4). The masking operation over the predetermined time period $t_w$ is implemented across the first zero crossing detection point ZC1 when the focus error signal FE changes its level from the vicinity of the zero level to the absolute maximum value $V_{|max|}$. Consequently, the microcomputer 8 detects a second zero crossing point ZC2 in the step S4, that is, the microcomputer 8 do not detect the trailing edge of the signal FZC but the leading edge thereof.

The zero crossing detection circuit 6 detects the zero crossing of the focus error signal FE in the following manner. Specifically, as to a negative level of the focus error signal FE, the circuit 6 detects the zero crossing when the negative level of the signal FE traverses a predetermined threshold value ($-V_{th}$). As to the positive level of the signal FE, the circuit 6 detects the zero crossing, when the positive level of the signal FE transverses a predetermined value ($+V_{th}$). The threshold values $-V_{th}$ and $+V_{th}$ have an absolute value by which is determined that the focus error signal FE has a larger level far away from the zero level, or that the signal FE is changed from a relative larger absolute value level to the vicinity of the zero level. Actually, the circuit 6 determines that the level of the focus error signal FE exceeds a predetermined voltage level.

When the second zero crossing point ZC2 is detected in step 54, the microcomputer 8 drops the level of the kick pulse FKP (step S5). This causes the jump pulse generating circuit 13 to drop the level of the output jump pulse FP to the zero level. The adder 11 then add the jump pulse FP having the zero level and the holding level transmitted from the level holding circuit 10 through the selector 9 to produce the sum output equal to the level supplied from the level holding circuit 10. Thus, the focus actuator 30 receives the drive signal FD which abruptly has dropped its level from the driver amplifier 14. However, since the actuator 30 has an inertia moment for driving the focus actuator 30, which is produced from the kick pulse FKP, the focus actuator 30 continues to move the focal point of the light beam toward the target recording surface with a moving speed of the actuator 30 reduced.

Thereafter, the microcomputer 8 monitors the zero crossing detection signal FZC to detect a trailing edge of the signal FZC (step S6). This corresponds to the detection of a third zero crossing point ZC3. Before the focus error signal FE enters a focus controllable range for the target recording surface, the signal FE exceeds the threshold value $+V_{th}$, which results in the detection of the third zero crossing point ZC3 (see FIG. 1).

Upon detecting the third zero crossing point ZC3, the micro computer 8 generates the brake pulse FBP (step S7). This causes the jump pulse generating circuit 13 to drop the level of the output jump pulse FP at a lower negative value. The adder 11 then adds the jump pulse FP having the lower level and the holding level transmitted from the level holding circuit 10 through the selector 9 to supply the resultant level to the driver amplifier 14. The driver amplifier 14 then supplies the drive signal FD to stop the movement of the focal point of the light beam toward the target recording surface. Accordingly, the focus actuator 30 gradually reduces the moving speed.

While the moving speed of the focus actuator 30 is decelerated, the microcomputer 8 monitors the zero crossing detection signal FZC to detect the leading edge of the signal FZC (step S8). This corresponds to the detection of a fourth zero crossing point ZC4. The focus error signal FE has a level increasing when the focal point of the light beam approaches closer to the target recording surface from a position corresponding to the third zero crossing point ZC4. After reaching the absolute maximum value $V_{|max|}$, the focus error signal FE has the level decreasing gradually (see FIG. 4). The signal FE then the level of zero when the focal point of the light beam just arrives on the target recording surface. When the signal FE has the zero level, the fourth zero crossing point ZC4 is detected.

When the fourth zero crossing point ZC4 is detected, the micro computer 8 drops the level of the brake pulse FBP (step S9), and drops the level of the jump status signal FJUMP to close the focus servo loop (step S10). This causes the jump pulse generating circuit 13 to increase the level of the output jump pulse FP to the zero level. Simultaneously, the selector 9 is caused to relay the focus error signal FE supplied from the equalizer 7 to the driver amplifier 14 through the adder 11. Consequently, the focus actuator 30 performs a normal focus servo operation for placing the focal point of the light beam on the target recording surface in response to the focus error signal FE.

Thus, the focus jump operation is completed. The microcomputer 8 then switches the operation mode to a reproduction mode for reproducing the information recorded on the target recording surface.

The focus jump operation in this embodiment is characterized in that the control for expiring the kick pulse during the predetermined time period $t_w$ is performed on the basis of the zero crossing detection. Thus, even if the focus error signal has an unusual zero crossing point due to any reasons during the predetermined time period $t_w$, the microcomputer 8 never erroneously expires the kick pulse earlier than expected, so that the jump operation of the focal point to the target recording surface can be successfully conducted with a certainty.

Figure 5:
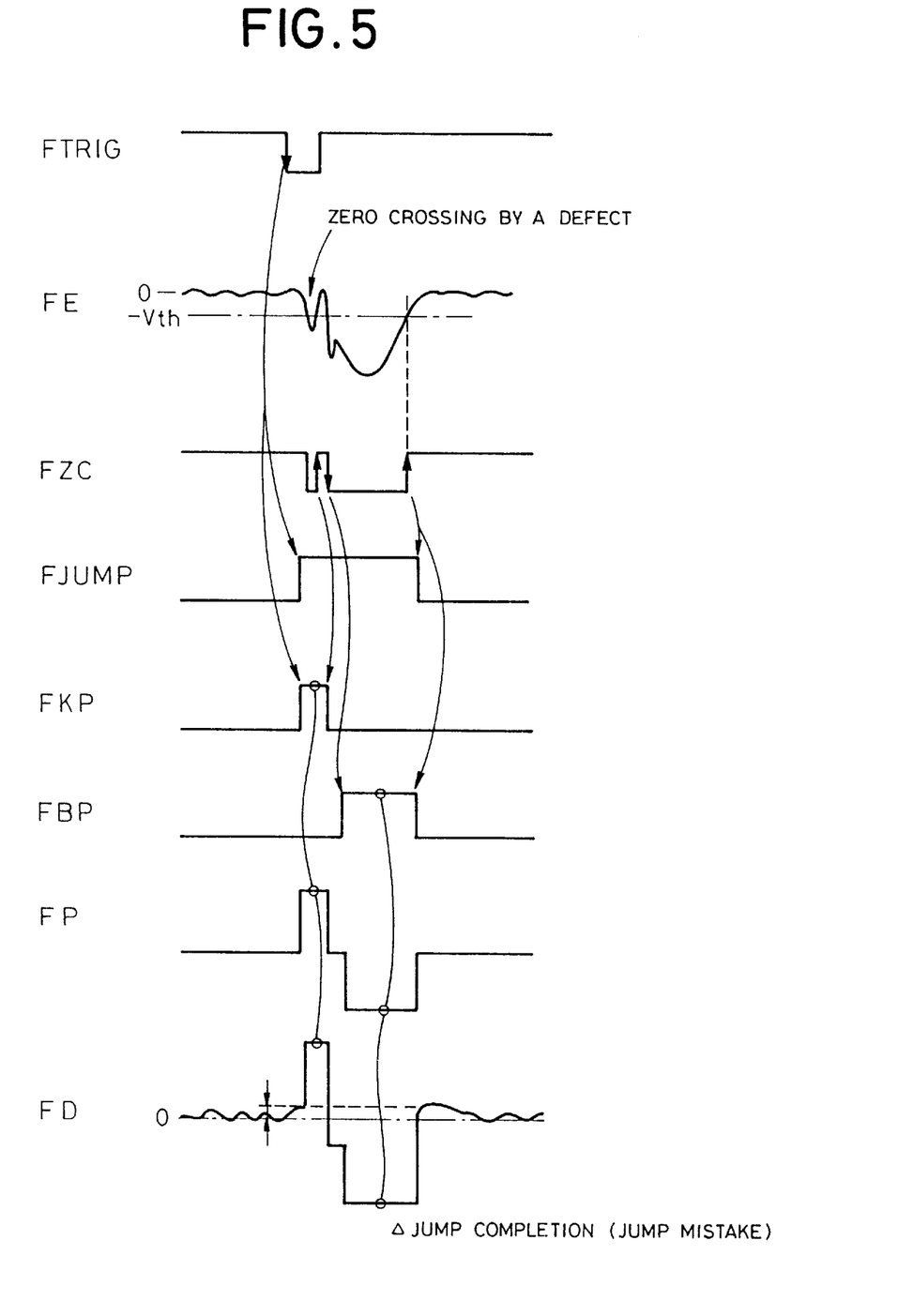
FIG. 5 shows waveforms of outputs appearing on various points of the focus control apparatus in the focus jump operation, when the focus control apparatus does not function to mask the zero crossing of the focus error signal.

In order to describe the above operations clearly, FIG. 5 shows waveforms appearing on each of points in the focus control apparatus when the focus jump operation is conducted without the masking over the predetermined time period $t_w$. In this embodiment, if the focus error signal FE has a whisker-shaped level fluctuation of the signal level attributed to flaws, the zero crossing detection signal FZC has the corresponding trailing and leading edges sequentially in response to the level fluctuation of the signal FE in a short time. Therefore, the microcomputer completes the generation of the kick pulse FKP in response to the leading edge of the zero crossing detection signal FZC and starts to generate the brake pulse FBP in response to the trailing edge of the zero crossing detection signal FZC which occurs immediately after the above leading edge of the signal FZC. After all, the drive signal FD formed in the above manner includes a very short pulse width corresponding to the kick pulse and another short pulse width corresponding between the kick pulse and brake pulse. When the focus actuator 30 receives the above drive signal, the actuator 30 fails to allow the focal point of the light beam to move to the target recording surface, which results in a failure of the jump operation.

On the contrary, the present invention provides the masking means for inhibiting the recognition of the zero crossing point by the microcomputer 8 for the predetermined time period $t_w$. Therefore, even if an unusual zero crossing in the focus error signal FE occurs due to the defect shown in FIG. 5, a satisfactory jump operation can be performed by ignoring the unusual zero crossing. There is a probability of occurring a similar unusual zero crossing near the fourth zero crossing point ZC4 of the focus error signal FE. Even though the trailing edge timings of the jump status signal FJUMP and brake pulse FBP are disturbed because of an erroneous zero crossing detection, the focus servo loop is only closed earlier. Therefore, the whole of the focus jump operation is never affected by the disturbances of the signals FJUM and FBR The focus error signal FE between the second and third zero crossing points ZC2 and ZC3 is associated with the movement of the focal point of the light beam between the first and second recording surfaces. Therefore, even if there is a defect on the disk, the focus error signal FE between the second and third zero crossing points ZC2 and ZC3 has less influence due to the defect.

Figure 6:
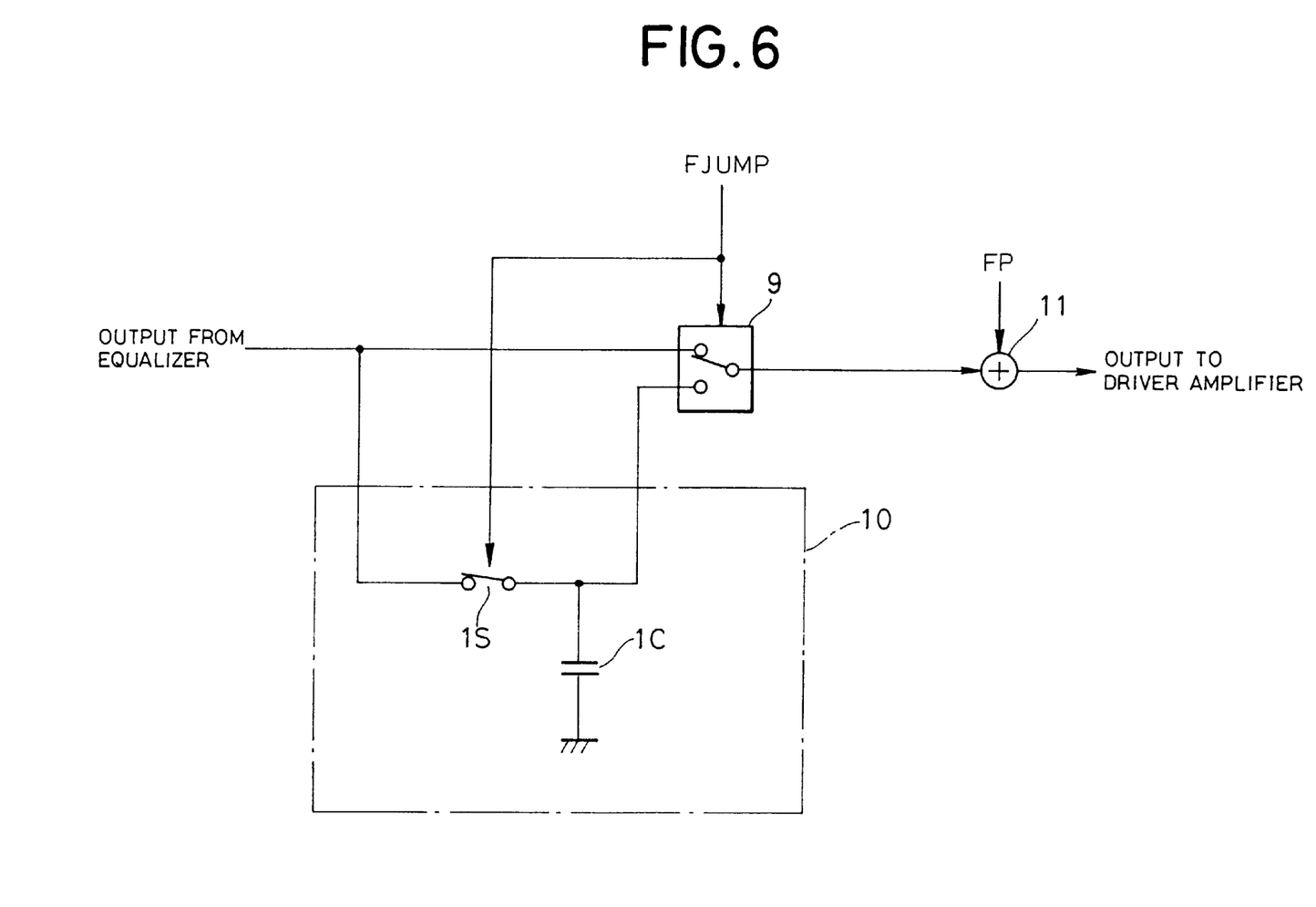
FIG. 6 is a circuit diagram showing a level holding circuit of the player of FIG. 2 and a peripheral device.

Next, the level holding circuit 10 will be described in detail below.

FIG. 6 shows a detailed circuit diagram of the level holding circuit 10 and a peripheral device. The level holding circuit 10 comprises a switching circuit 1S having an input terminal supplied with an output signal of the equalizer 7 and a control terminal supplied with a jump status signal FJUMP from the microcomputer 8, and a capacitor 1C connected between an output terminal of the switching circuit 1S and a ground. A signal on an output line from of the switching circuit 1S is supplied to one input terminal of the selector as an output of the level holding circuit.

In the level holding circuit 10, when the jump status signal FJUM has a lower level, that is, when the focus servo loop is closed, the switching circuit 1S is closed, and a voltage based on an output of the equalizer is applied over the capacitor 1C. In this case, the selector 9 selects an output of the equalizer, so that the adder 11 can receive the output of the equalizer.

On the contrary, when the jump status signal FJUM has a higher level, that is, when the focus servo loop is opened, the switching circuit 1S is opened, so that the voltage charged immediately before the open of the switching circuit 1S is kept over the capacitor 1C. At this time, the selector 9 selects an output from the level holding circuit 10, so that the adder 11 can receive the voltage charged in the capacitor 1C.

A function of the level holding circuit 10 is to cope with vibrations (surface wobble) in the direction of the normal of the surface of the disk 1 which is caused by the rotation of the disk 1. Specifically, the vibrations causes the recording surface of the disk 1 to vibrate in the direction perpendicular to the recording surface. Therefore, the focus error signal has the corresponding fluctuation in the level. When the focus jump operation is performed under such the circumstance, in particular, when a magnitude of the vibrations are larger, the drive of the focus actuator by the kick pulse having a fixed voltage level results in that the focal point of the light beam cannot move until it reaches the vicinity of the target recording surface. Otherwise, the situation may occur in which the focal point of the light beam overruns to the target recording surface.

Therefore, in this embodiment, the level holding circuit 10 is provided. When the focus actuator 30 is driven by the kick pulse, the voltage level corresponding to the vibration component included in the focus error signal is added to the voltage level of the kick pulse to produce the drive signal for the focus actuator for absorbing the vibrations.

In the above description, the focus jump operation in one direction is described. It is within the scope of the invention to perform the focus jump operation in the opposite direction. In this case, the focus error signal FE has the opposite polarity of the S-shaped profile described. Moreover, the focus actuator is driven in the opposite direction. Therefore, it is required that the corresponding kick pulse, brake pulse and jump status signal should be generated.

In the above described embodiment, although the two layer recording type DVD is mentioned, the present invention is not limited to DVD. It is within the scope of the invention to use a disk having at least two stacked information recording surface.

As described above, according to the present invention, it is possible to successfully perform an accurate focus jump operation without an erroneous operation of the focus actuator.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A focus control apparatus for irradiating a light beam onto a recording surface formed in each of at least two layers of a recording medium, and generating a drive signal for a focus actuator for moving an optimized light convergence point of said light beam from one recording surface to the other, based on a focus error signal, said focus error signal being generated based on a returned light from said recording medium, said apparatus comprising:

detecting means for determining that said focus error signal crosses a predetermined level to detect a specified level crossing;

instruction means for generating a focus jump instruction;

drive signal generating means for generating said drive signal in response to said focus jump instruction and for receiving an output from said detection means to recognize a timing for detecting a specified level crossing of said focus error signal upon receipt of said output, thereby extinguishing said drive signal in response to said timing; and inhibiting means for inhibiting the recognition of said timing by said drive signal generating means for a predetermined period in response to said focus jump instruction.

2. The focus control apparatus according to claim 1, wherein said predetermined period is a period until a predetermined time elapses after generation of said focus jump instruction.

3. The focus control apparatus according to claim 2, wherein said predetermined time period has a longer time length than the time from the generation of said focus jump instruction to a time point on which said focus error signal first obtains said specified level crossing in a normal operation.

4. The focus control apparatus according to claim 1, wherein said drive signal generating means generates an acceleration signal having a level for accelerating and moving said focus actuator along the direction of movement of the optimized light convergence point of said light beam to supply the acceleration signal as said drive signal.

5. The focus control apparatus according to claim 4, wherein said drive signal generating means generates a deceleration signal having a level for decelerating said focus actuator in order to stop the movement of the optimized light convergence point of said light beam subsequent to the generation of said acceleration signal on the basis of the timing of the specified level crossing.

6. The focus control apparatus according to claim 2, wherein said drive signal generating means generates an acceleration signal having a level for accelerating and moving said focus actuator along the direction of movement of the optimized light convergence point of said light beam to supply the acceleration signal as said drive signal.

7. The focus control apparatus according to claim 3, wherein said drive signal generating means generates an acceleration signal having a level for accelerating and moving said focus actuator along the direction of movement of the optimized light convergence point of said light beam to supply the acceleration signal as said drive signal.

* * * * *